United States Patent
Stewart

(10) Patent No.: US 10,247,422 B2
(45) Date of Patent: *Apr. 2, 2019

(54) COMBUSTION SYSTEM

(71) Applicant: Jason Joren Jens Stewart, Warkworth (NZ)

(72) Inventor: Jason Joren Jens Stewart, Warkworth (NZ)

( * ) Notice: Subject to any disclaimer, the term of this patent is extended or adjusted under 35 U.S.C. 154(b) by 502 days.

This patent is subject to a terminal disclaimer.

(21) Appl. No.: 14/780,762

(22) PCT Filed: Mar. 27, 2014

(86) PCT No.: PCT/NZ2014/000052
§ 371 (c)(1),
(2) Date: Sep. 28, 2015

(87) PCT Pub. No.: WO2014/158032
PCT Pub. Date: Oct. 2, 2014

(65) Prior Publication Data
US 2016/0047551 A1 Feb. 18, 2016

(30) Foreign Application Priority Data
Mar. 28, 2013 (NZ) ........................ 608872

(51) Int. Cl.
*F24B 1/02* (2006.01)
*F24B 5/02* (2006.01)
(Continued)

(52) U.S. Cl.
CPC ............ *F24B 1/026* (2013.01); *F23B 10/02* (2013.01); *F23B 50/06* (2013.01); *F23B 80/04* (2013.01);
(Continued)

(58) Field of Classification Search
CPC ........... F23L 15/00; F23L 9/04; Y02E 20/348; F24B 1/026; F24B 5/025; F24B 5/026; F23B 50/06; F23B 10/02; F23B 80/04
See application file for complete search history.

(56) References Cited

U.S. PATENT DOCUMENTS

| 4,559,882 A | 12/1985 | Dobson |
| 4,630,553 A | 12/1986 | Goetzman |

(Continued)

FOREIGN PATENT DOCUMENTS

| EP | 0708298 A2 * | 4/1996 | ............... F23B 5/04 |
| WO | WO 2003/048645 | 6/2003 | |
| WO | WO 2012/150868 | 11/2012 | |

OTHER PUBLICATIONS

International Search Report dated Jun. 19, 2014 in corresponding PCT/NZ2014/000052.

*Primary Examiner* — David J Laux
(74) *Attorney, Agent, or Firm* — Young & Thompson

(57) ABSTRACT

Disclosed is a fireplace which includes a firebase, a primary combustion zone with a first air supply unit, a secondary combustion zone, and an exhaust flue. The fireplace place also includes a charcoal/reduction layer which forms between the primary combustion zone and the secondary combustion zone, the arrangement and construction being such that the gases and/or particulate matter produced from the pyrolysis and/or combustion of the biomass fuel in the primary combustion zone have to pass over, or through, the charcoal/reduction layer prior to entering the secondary combustion zone and/or the exhaust flue. The fireplace also includes a second air supply unit for introducing heated secondary air into, or adjacent to, the secondary combustion zone, the arrangement and construction being such that the secondary air passes through (or adjacent to the region of) the charcoal/reduction layer to thus heat the secondary air.

12 Claims, 7 Drawing Sheets

Figure 1:
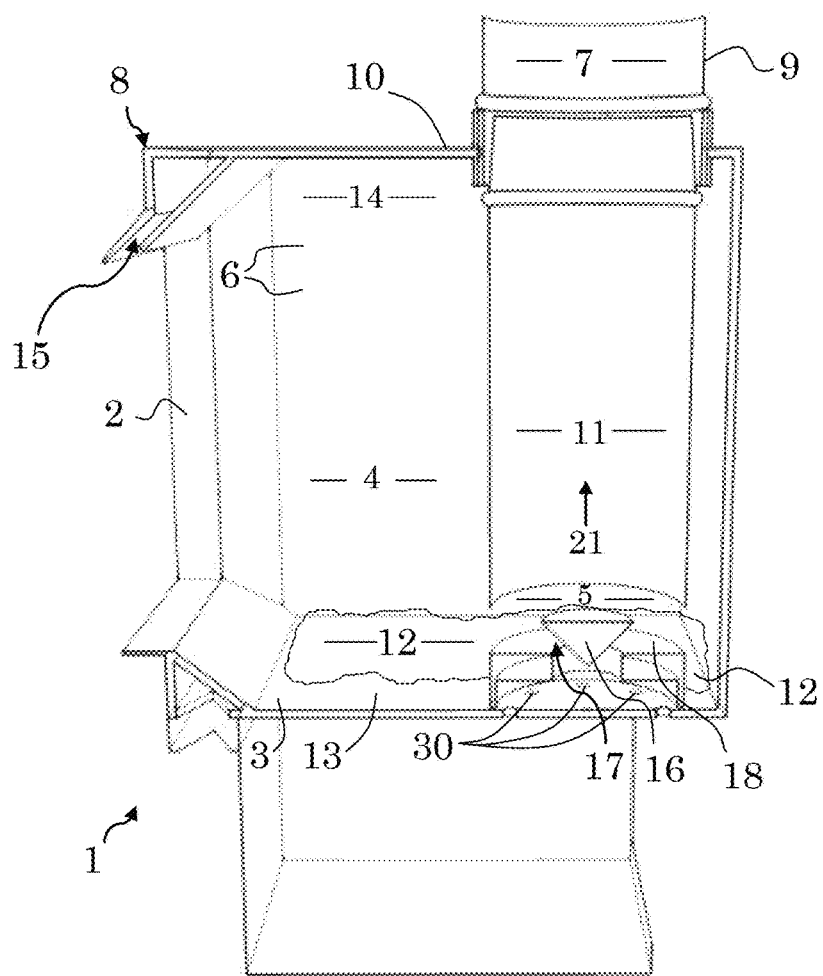

(51) Int. Cl.
*F23L 15/00* (2006.01)
*F23B 50/06* (2006.01)
*F23L 15/04* (2006.01)
*F23B 80/04* (2006.01)
*F23B 10/02* (2011.01)
*F23L 9/04* (2006.01)

(52) U.S. Cl.
CPC ................ *F23L 9/04* (2013.01); *F23L 15/00* (2013.01); *F23L 15/04* (2013.01); *F24B 5/025* (2013.01); *F24B 5/026* (2013.01); *Y02E 20/348* (2013.01)

(56) References Cited

U.S. PATENT DOCUMENTS

| | | |
|---|---|---|
| 4,672,946 A | 6/1987 | Craver |
| 4,832,000 A * | 5/1989 | Lamppa .................. F24B 5/026 126/66 |
| 4,854,298 A | 8/1989 | Craver |
| 4,856,491 A * | 8/1989 | Ferguson ................ F24B 1/026 126/193 |
| 2011/0005509 A1 | 1/2011 | Marple |

\* cited by examiner

COMBUSTION SYSTEM

FIELD

This invention relates to an improved combustion system. The invention may be particularly suitable for use in relation to domestic wood burners, which burn biomass fuels, and for convenience only therefore, the invention will be predominantly described in relation to such use.

However, it is to be understood and appreciated that the invention may also have other applications and/or uses—for example, in relation to open fireplaces, masonry fireplaces, furnaces, oil, and gas fireplaces, and so on. The combustion system may also have industrial applications or uses.

The prior art and possible applications of the invention, as discussed below, are therefore given by way of example only.

BACKGROUND

A problem associated with the burning of biomass fuel in general is the production of air pollutants. For example, the burning of biomass fuel (and particularly the inefficient burning of biomass fuel) may produce volatile, toxic, or other undesirable gases. Furthermore, large amounts of smoke and particulate matter may also be released into the atmosphere.

In this regard open fireplaces are particularly inefficient. That is, open fireplaces usually produce larger amounts of air pollutants, as compared to enclosed fireplaces. Furthermore, an open fireplace generally only provides heat directly in front of the fireplace, with the vast majority of the heat being lost up through the chimney or out through the rear wall of the fireplace.

The inefficiency of open fire places has been addressed to a certain extent by the use of domestic furnaces. Examples can be found in U.S. Pat. No. 4,559,882 (Dobson) and U.S. Pat. No. 4,630,553 (Goetzman).

However, whilst the problems of the inefficient burning of biomass fuel for space heating can be addressed somewhat with a furnace, the extra capital cost is not always necessary, practical, or affordable. Moreover, furnaces are usually closed off from view, and do not therefore provide the psychological or aesthetic benefits that are derived from seeing (or hearing) flames.

Perhaps as a result, domestic wood burners have become increasingly more popular over the years, and are now in widespread use. "Wood Stove" is another common term for such appliances, particularly in North America.

Wood burners generally comprise a metal firebox, into which biomass fuel may be placed and burnt, an adjustable air control or damper, and an exhaust flue. Many, if not most, wood burners also have a glass door through which the fire and/or flames may be viewed.

The combustion of biomass fuel is a complex process, and includes a range of chemical reactions.

The main stages associated with combustion are drying, pyrolysis, combustion and reduction, which if done correctly produce the combustible gases carbon monoxide and hydrogen (along with small amounts of other gases such as methane). The carbon monoxide and hydrogen can then be combusted separately during what is known as secondary combustion to yield water and carbon dioxide (and heat).

However, most wood burners lack the ability to adequately combust or convert the combustible gases (during secondary combustion) due to the wood burner not being able to produce and/or maintain high enough temperatures to do so.

That is, the temperature required to combust or convert most of the various combustible gases (and/or particulate matter) is between 500-800° C.

In general terms, to ensure complete combustion of the biomass fuel, and any resulting combustible gases and/or particulate matter, the fire needs to reach and consistently maintain a temperature of 750° C. or greater (for the entire flame path). And whilst many prior art wood burners can attain such a temperature at times, they lack the ability to consistently maintain the fire above this temperature—resulting in periods of incomplete combustion.

U.S. Pat. No. 4,672,946 (Craver) describes a wood burner which has a secondary combustion means for burning the particulate matter in the flue gases. However, the temperature reached within the firebox of the Craver device is stated as being only around 540° C. (1000° F.) and the secondary combustion region only reaches up to around 760° C. (1400° F.). Hence, a disadvantage associated with Craver is that the wood burner is not able to maintain temperatures high enough to consistently combust or convert the combustible gases and/or particulate matter.

It may be of advantage therefore if there was a combustion system which had the ability to reach and maintain temperatures high enough to consistently combust or convert the combustible gases and/or particulate matter.

In recent times, many countries or local bodies have introduced regulations to restrict the sale of inefficient and/or polluting wood burners.

For example, in New Zealand the generally allowable standard for wood burners is a maximum of 1.5 grams of particulate matter released per kilogram of wood burned, accompanied by a minimum efficiency of 65%. However, some regions have gone further than this. For example, the Canterbury Regional Council in New Zealand (which is in the region of a weather-inversion layer) has lowered these levels to 1.0 grams of particulate matter per kilogram of wood burned. The Regulations further restrict the use of wood with a moisture content higher than 25%.

However, these Regulations are not retrospective, and hence they only have effect in relation to wood burners manufactured and sold after the Regulations came into force. Moreover, to date there have been no innovations which have enabled people to bring their older wood burners up to modern compliance levels (voluntarily or otherwise).

It may be of advantage therefore if there was available a combustion system which was able to be retro-fitted to an existing wood burner, for example to increase its efficiency and/or to bring it up to modern compliance standards.

Two factors which usually have the most detrimental effect regarding the efficiency of, and/or the release of air pollutants from, a wood burner are to do with refueling the wood burner and when shutting down or reducing the air supply to the wood burner.

Refueling causes quenching, a situation where the introduction of fresh fuel to the fire is not supported by the heat contained within the existing fire to adequately pyrolyse the biomass. As a result, visible smoke and particulate matter are often seen exiting the top of the flue or chimney at this time. This can take a while to subside as enough heat builds up in the fire to commence the correct chemical processes required to efficiently and/or completely combust the fresh fuel.

Hence, a common problem associated with existing wood burners is that during times of refueling, and the resultant quenching, the temperature within existing wood burners decreases significantly, and to temperatures below that at which the wood burner is able to efficiently or fully combust or convert the combustible gases and/or particulate matter—as described previously.

A wood burner user may wish to reduce the air supply to keep the fire burning longer and/or while they are asleep. This is known as "banking". In doing so, they generally place a full load of biomass fuel in the wood burner and shut down (or minimise) the air supply to prolong the burn time. However, the reduction in available oxygen and the corresponding detrimental effect on combustion results in more air pollutants being produced and released. Because this often results in the amount of air pollutants exceeding the minimum regulated amounts, many modern wood burner designs have denied the user the ability to shut down the air supply.

The air supply also affects the dynamics of wood burners because a greater draught causes more heat to be generated, but a greater portion of heat is lost up the flue. The higher velocity of gases also results in more particulate matter being exhausted to the atmosphere.

Conversely, a lesser draught reduces the amount of particulate matter being exhausted from the combustion chamber but also reduces the heat output. However, although less heat may be generated, less heat is also lost to the atmosphere as the heat has more time to radiate off before being exhausted.

Or to put it another way, increased air supply means greater heat, but lower efficiency, however the greater heat actually results in a cleaner burn which lowers the emissions. With a lesser air supply, the fires get greater efficiency but the lower heat increases emissions.

It may be of advantage therefore if there was available a combustion system which was both hot and efficient, resulting in both greater heat and fewer emissions.

Many existing wood burners have a primary combustion zone for pyrolysising and/or combusting the biomass fuel, and a secondary combustion zone for subsequently combusting the combustible gases and/or particulate matter produced from the pyrolysis and/or combustion of the biomass fuel.

Such wood burners often introduce a secondary air supply into the wood burner, in the region of the secondary combustion zone, designed to add extra oxygen and/or create turbulence, in an attempt to aid combustion. Examples of such wood burners include U.S. Pat. No. 4,856,491 Ferguson et al, U.S. Pat. No. 4,832,000 Lampa, U.S. Pat. No. 4,854,298 Craver and US 2011/0005509 Marple.

However, a disadvantage associated with such wood burners is that the introduction of the turbulent secondary air serves to increase the air supply (and oxygen content), resulting in greater heat but lower efficiency, as described above. Furthermore, the secondary air supply is not heated, and it therefore has the effect of quenching the fire when it is first introduced.

WO 2012/150868 Stewart describes a combustion system which includes a secondary air supply means which introduces heated secondary air into the region of the secondary combustion zone, with the secondary air supply being sourced from within the firebox. An advantage of such a system is that the secondary air supply means takes already-hot air from within the firebox, and super heats it, before introducing it into the secondary combustion zone (where the very high temperature of the air—not the oxygen content or turbulence—greatly assists combustion in the secondary combustion zone).

Whilst the combustion system described in Stewart is very effective, the oxygen content of the secondary air is minimal given that the secondary air is sourced from within the wood burner. Furthermore, the secondary air is heated by exhausting flue gases and the primary combustion zone, whereas the hottest region of the fire, and therefore perhaps the best region to heat the incoming secondary air, is the charcoal/reduction layer formed below the primary combustion zone and/or the region of the secondary combustion zone.

Having regard to the foregoing, it may be advantageous if there was available a relatively simple and/or improved combustion system, which included primary and secondary combustion zones which were able to result in the more efficient combustion of biomass fuels and/or result in a lesser amount of air pollutants being released, as compared to presently available or prior art combustion systems or wood burners.

OBJECT

It is an object of the present invention to provide a combustion system which goes some way towards addressing one or more of the above problems or difficulties, or which at the very least provides the public with a useful choice.

DEFINITIONS

Throughout this specification unless the text requires otherwise, the word 'comprise' and variations such as 'comprising' or 'comprises' will be understood to imply the inclusion of a stated integer or step or group of integers or steps but not the exclusion of any other integer or step or group of integers or steps.

Throughout this specification, the term "biomass" or "biomass fuel" is to be understood to include reference to any type of fuel which may be used for burning in a fireplace. Examples include (but are not limited to) wood, bark, sawdust, sawdust pellets, brush, straw, logs, coal, charcoal, oil and gas.

Throughout this specification, the term "wood burner" is to be understood to refer an enclosed firebox (often metal), and which (usually) has an adjustable air supply, and which is connected to a suitable exhaust flue. Other common names for a wood burner are "solid fuel burner" or "appliance". Moreover, terms such as "wood stove" or "wood burning stove" appear to be the names more commonly used in North America.

Throughout this specification, the term "fireplace" is to be understood to include any type of structure used for containing or housing a fire. Examples include (but are not limited to) wood burners, open fireplaces, masonry fireplaces and furnaces.

STATEMENTS OF INVENTION

According to one aspect of the present invention, there is provided a combustion system, said combustion system including:
  a) a fireplace, said fireplace including:
    i. a firebase at, or forming, the bottom of the fireplace,
    ii. a primary combustion zone for pyrolysising and/or combusting a biomass fuel,
    iii. a first air supply means for supplying primary air to the primary combustion zone, iv. a secondary combustion zone for combusting gases and/or particulate matter produced from the pyrolysis and/or combustion of the biomass fuel,
v. an exhaust flue,
b) a second air supply means for introducing heated secondary air into, or adjacent to, the secondary combustion zone, the arrangement and construction being such that said secondary air passes through (or adjacent to the region of) the secondary combustion zone, to thus heat the secondary air.

According to another aspect of the present invention, there is provided a combustion system, substantially as described above, wherein said fireplace is an open fireplace.

In the case of an open fireplace, the first air supply means may simply be provided for by the surrounding air.

According to an alternative aspect of the present invention, there is provided a combustion system, said combustion system including:
a) a wood burner, said wood burner including:
  i. a firebox,
  ii. a firebase at, or forming, the bottom of the firebox,
  iii. a primary combustion zone for pyrolysising and/or combusting a biomass fuel,
  iv. a first air supply means for supplying primary air into the firebox,
  v. a secondary combustion zone for combusting gases and/or particulate matter produced from the pyrolysis and/or combustion of the biomass fuel,
  vi. an exhaust flue,
b) a charcoal/reduction layer which forms below the primary combustion zone, and/or in the region of the secondary combustion zone and/or between the primary combustion zone and the secondary combustion zone, the arrangement and construction being such that the gases and/or particulate matter produced from the pyrolysis and/or combustion of the biomass fuel in the primary combustion zone have to pass over, or through, said charcoal/reduction layer prior to entering the secondary combustion zone and/or the exhaust flue,
c) a second air supply means for introducing heated secondary air into the firebox, the arrangement and construction being such that said secondary air passes through (or adjacent to the region of) the charcoal/reduction layer and/or the secondary combustion zone, to thus heat the secondary air as it is being introduced into the firebox.

The firebase may be the floor or bottom of the firebox of the wood burner.

The firebase may also include a grate which is housed within (or which forms) the floor of the firebox of the wood burner. In such an embodiment, ash may collect below the grate where it may be removed, for example by opening a lower door or tray in the wood burner specifically for this purpose.

Preferably, the fireplace may include a primary combustion zone for pyrolysising and/or combusting the biomass fuel.

Preferably, the combustion system may include a first air supply means for supplying primary air into the firebox, for example for supplying primary air for pyrolysising and/or combusting the biomass fuel in the primary combustion zone.

The first air supply means may, for example, be provided by an air duct leading into the firebox of the wood burner. The amount of air that may be permitted to enter the wood burner may be adjustable, for example by the operation of an air damper lever with respect to an air valve.

Preferably, the combustion system may include a drying zone for drying the biomass fuel and/or removing water from the biomass fuel prior to the pyrolysis and/or combustion of the fuel.

The drying zone may preferably be situated above the primary combustion zone. That is, biomass fuel may be introduced above the primary combustion zone in an area that forms, and serves, as a drying zone. Provision for introducing biomass fuel may, for example, be provided via a hinged door at the top or front of the wood burner.

It is also envisaged that the drying zone may be included within, or comprise part of, the primary combustion zone.

Preferably, the wood burner may include a secondary combustion zone for combusting gases and/or particulate matter produced from the pyrolysis and/or combustion of the biomass fuel.

Preferably, the combustion system or wood burner may include an exhaust flue.

The exhaust flue may preferably extend through the top or rear (or side) of the firebox of the wood burner, and subsequently extend up through the roof or ceiling of the dwelling where the wood burner is housed.

In one embodiment, the exhaust flue may include a lower portion, with the lower portion extending to a position near to, or adjacent, the secondary combustion zone and/or the firebase and/or the charcoal/reduction layer. An example of such an arrangement is described in WO 2012/150868 Stewart, and the contents of that patent are therefore incorporated herein by reference.

Preferably, the combustion system, when in operation, may include, or result in, a charcoal/reduction layer which forms below the primary combustion zone, and/or in the region of the secondary combustion zone and/or between the primary combustion zone and the secondary combustion zone, the arrangement and construction being such that the gases and/or particulate matter produced from the pyrolysis and/or combustion of the biomass fuel in the primary combustion zone have to pass over, or through, said charcoal/reduction layer prior to entering the secondary combustion zone and/or the exhaust flue.

According to another aspect of the present invention there is provided a combustion system substantially as described above, wherein said exhaust flue includes a lower portion, and said lower portion extends to a position near to, or adjacent, said secondary combustion zone and/or said firebase and/or said charcoal/reduction layer.

For example, it may be appreciated that by extending the flue towards the secondary combustion zone and/or said firebase and/or said charcoal/reduction layer, the combustion gases generated from the primary combustion zone are required to travel down and across to the mouth of the flue in order to enter the flue. This has the effect of drawing the combustion gases across the charcoal/reduction layer, thus enhancing the further reduction of volatiles and steam to combustible gases such as hydrogen and carbon monoxide. The natural draught (or drawing effect) created by the exhaust flue should be adequate to facilitate this process. Moreover, this means that the lower portion of the exhaust flue may therefore help to create and/or fuel the secondary combustion zone at (or adjacent) its opening.

Preferably, the combustion system may include a second air supply means for introducing heated secondary air into the firebox, the arrangement and construction preferably being such that the secondary air passes through (or adjacent to the region of) the charcoal/reduction layer and/or the secondary combustion zone to thus heat the secondary air as it is being introduced into the firebox.

According to another aspect of the present invention, there is provided a combustion system, substantially as described above, wherein said secondary combustion zone is partially or wholly surrounded by, and/or insulated by, and/or encompassed by said primary combustion zone.

It may be appreciated that such an arrangement enables very high combustion temperatures to be attained, and maintained, in the region of the secondary combustion zone. That is, the combustion system is, in essence, insulating fire with fire and this is a significant feature of, and/or advantage associated with, the present invention.

According to another aspect of the present invention, there is provided a combustion system, substantially as described above, wherein the second air supply means sources secondary air from outside of the firebox.

According to another aspect of the present invention, there is provided a combustion system, substantially as described above, wherein said second air supply means is in the form of one or more apertures formed in the firebase of the firebox, whereby said secondary air is introduced into the firebox via said one or more apertures.

According to another aspect of the present invention, there is provided a combustion system, substantially as described above, wherein said one or more apertures are formed in the firebase below the secondary combustion zone.

According to another aspect of the present invention, there is provided a combustion system, substantially as described above, wherein said one or more apertures are formed in the firebase below the charcoal/reduction layer.

According to an alternative aspect of the present invention, there is provided a combustion system, substantially as described above, wherein said second air supply means includes an air channel which penetrates the exhaust flue and which extends to a position near to, or within, said secondary combustion zone and/or said charcoal/reduction layer.

In such an embodiment, it may be preferable to create an aperture in the exhaust flue at a point above the top of the firebox of the wood burner. An air channel may then be inserted through this aperture and be extended downwards to the secondary combustion zone and/or the charcoal/reduction layer.

According to another aspect of the present invention, there is provided a combustion system, substantially as described above, wherein the combustion system further includes insulation means for insulating the region of the secondary combustion zone and/or the charcoal/reduction layer.

One purpose of the insulation means may be to maximise temperatures within the secondary combustion zone.

An example of a suitable insulation means may be a block of a heat resistant and/or insulative material, such as bricks or a high thermal resistant ceramic material.

In one embodiment, the insulation means may preferably include one or more apertures, through which the secondary air may pass.

Preferably, the insulation means may be in the form of a ceramic disc.

Alternatively, the insulation means may be a cast iron disc.

Whilst not an essential part of the invention, the insulation means may also serve to introduce a degree of air turbulence or mixing into the secondary combustion zone. The introduction of a degree of turbulence into the secondary combustion zone may serve to enhance the efficiency of combustion and/or maintain high temperatures.

In another embodiment, the inside of the firebox may be lined with an insulative material, such as a ceramic material, in order to maximise heat within the primary combustion zone and/or the firebox of the wood burner. In such an arrangement, the ceramic material may be contoured or shaped so as to minimise any dead air zones within the firebox and/or maximise overall air flows within the firebox.

In this regard, and in one embodiment, one or more apertures may be drilled (or formed) into the sides and/or rear of the firebox in order to minimise any dead air zones within the firebox and/or maximise overall air flows within the firebox.

According to another aspect of the present invention, there is provided a combustion system, substantially as described above, wherein the second air supply means sources secondary air from inside of the firebox.

According to another aspect of the present invention, there is provided a combustion system, substantially as described above, wherein the combustion system may be retro-fitted to an existing wood burner.

In such an embodiment, the combustion system may be retrofitted to existing fireplaces by making appropriate modifications or alterations.

Alternatively, the invention may be incorporated into new fireplaces.

The ignition point of wood gas, according to various reports is between 300° C. & 600° C., most likely towards the upper end of that range—which is actually quite difficult to achieve.

However, with my combustion system, where secondary air is preferably introduced through the very hot charcoal/reduction layer and/or the very hot secondary combustion zone, the secondary air is pre-heated above 600° C. Late in the burn cycle of a batch a fire cools quite significantly, and I believe the charcoal/reduction layer (or the secondary combustion zone) is the only place left where the temperature consistently remains above 600° C. When new fuel is introduced to my combustion system, I am getting ignition instantaneously, whereas other prior art fireplaces take considerable time to reach this temperature. Hence, while prior art fireplaces are getting back up to temperature, they are emitting polluting gases and particulate matter.

Or in other words, there is no quenching of the fire of my combustion system upon the introduction of new fuel—as happens with other fire places. This is therefore an important feature of, and significant advantage associated with, my combustion system.

According to another aspect of the present invention, there is provided a combustion system, substantially as described above, wherein said combustion system includes a control means for controlling the transfer of the gases and/or the particulate matter produced from the pyrolysis and/or combustion of the biomass fuel.

In such an embodiment, the control means may be adapted to restrict the flow of the gases and/or the particulate matter from the primary combustion zone to the secondary combustion zone. Preferably the control means may be adjustable.

For example, a sleeve may be fitted either partially or fully around the secondary combustion zone to partially (or fully) restrict the flow of the gases and/or the particulate matter from the primary combustion zone to the secondary combustion zone.

Alternatively, or additionally, the flue may contain a telescoped, or telescopable, portion which may be extended or retracted, to thus narrow or expand respectively, the gap through which the flow of the gases and/or the particulate material from the primary combustion zone enter into the secondary combustion zone.

In such an embodiment, the control means may be utilised to provide for a substantially free flow of air while the fireplace is in the warm up phase. However, when the fireplace is hot the fire will be more efficient, and maintain a higher temperature, if the transfer of the gases and/or the particulate matter from the primary combustion zone to the secondary combustion zone is restricted.

Moreover, the control means may be utilised to facilitate a different transfer rate of gases and/or particulate matter from the primary combustion zone to the secondary combustion zone, as required or as desired.

The control means may be operated manually or alternatively it may be adapted to operate automatically.

According to another aspect of the present invention, there is provided a combustion system, substantially as described above, wherein the firebase is tapered and/or stepped towards the secondary combustion zone and/or the charcoal/reduction layer.

An advantage of such an embodiment is that the tapered and/or stepped firebase helps to accumulate hot embers and/or charcoal towards, or over, the entrance to the secondary combustion zone.

According to another aspect of the present invention, there is provided a combustion system, said combustion system including a wood burner, and said wood burner including:
  a) a primary combustion zone,
  b) a secondary combustion zone,
  the arrangement and construction being such that said secondary combustion zone is partially or wholly surrounded by, and/or insulated by, and/or encompassed by said primary combustion zone.

The importance of this "thermal layering" feature of the invention cannot be over emphasised. By essentially insulating fire with fire, this is a very effective system for reaching and consistently maintaining hot temperatures within a fireplace, and for achieving maximum combustion efficiency.

In a preferred embodiment, the secondary combustion zone may be fully encompassed within and/or surrounded by, the primary combustion zone—to ensure maximum heating of, and/or insulating of, the secondary combustion zone by/from the primary combustion zone.

PREFERRED EMBODIMENTS

The description of a preferred form of the invention to be provided herein, with reference to the accompanying drawings, is given purely by way of example and is not to be taken in any way as limiting the scope or extent of the invention.

DRAWINGS

Figure 2:
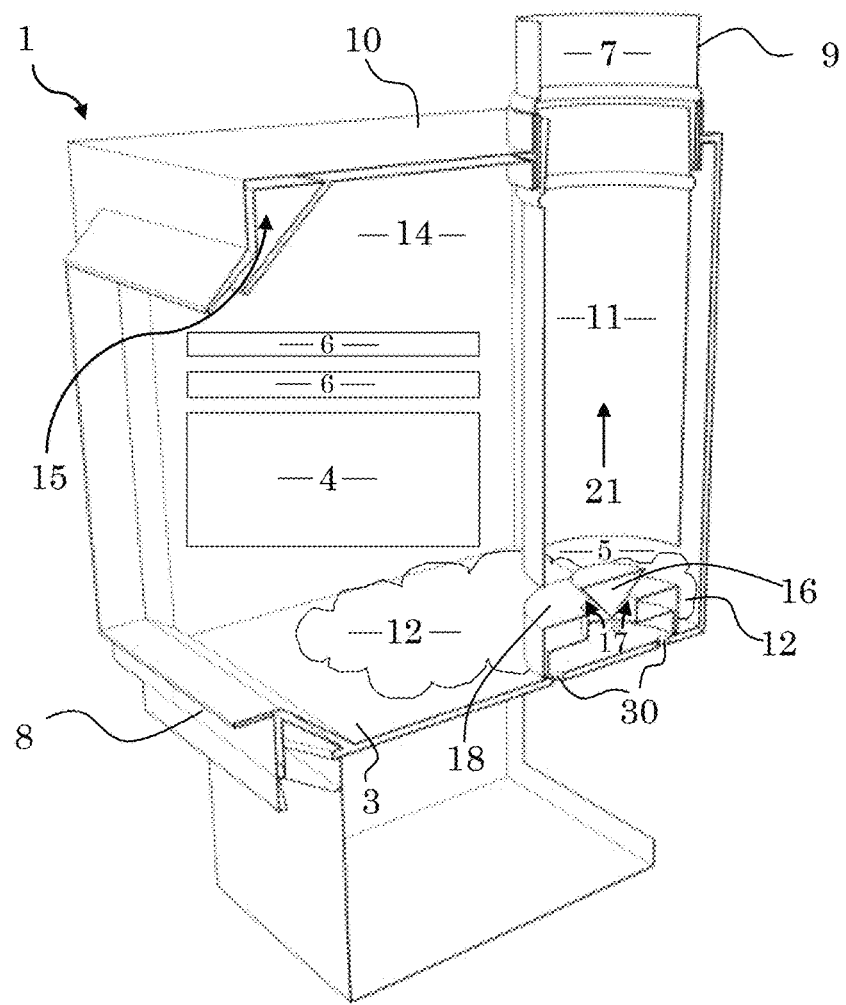
Figure 3:
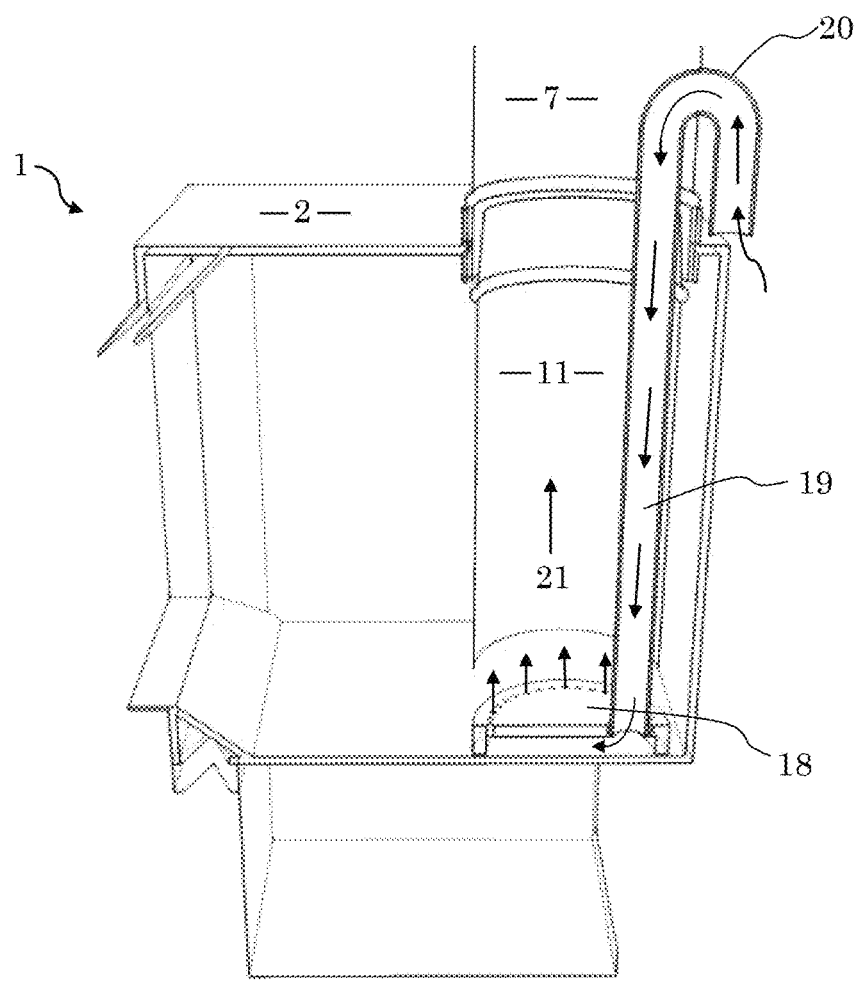
Figure 4:
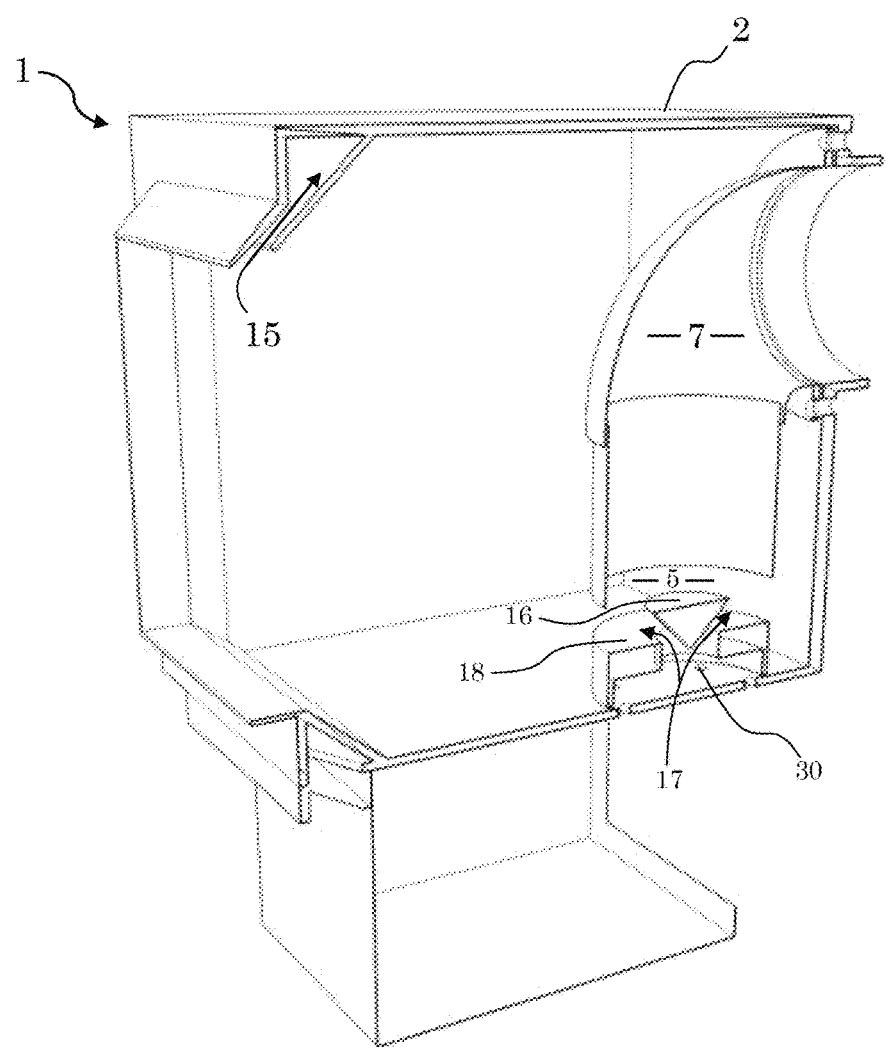
Figure 5:
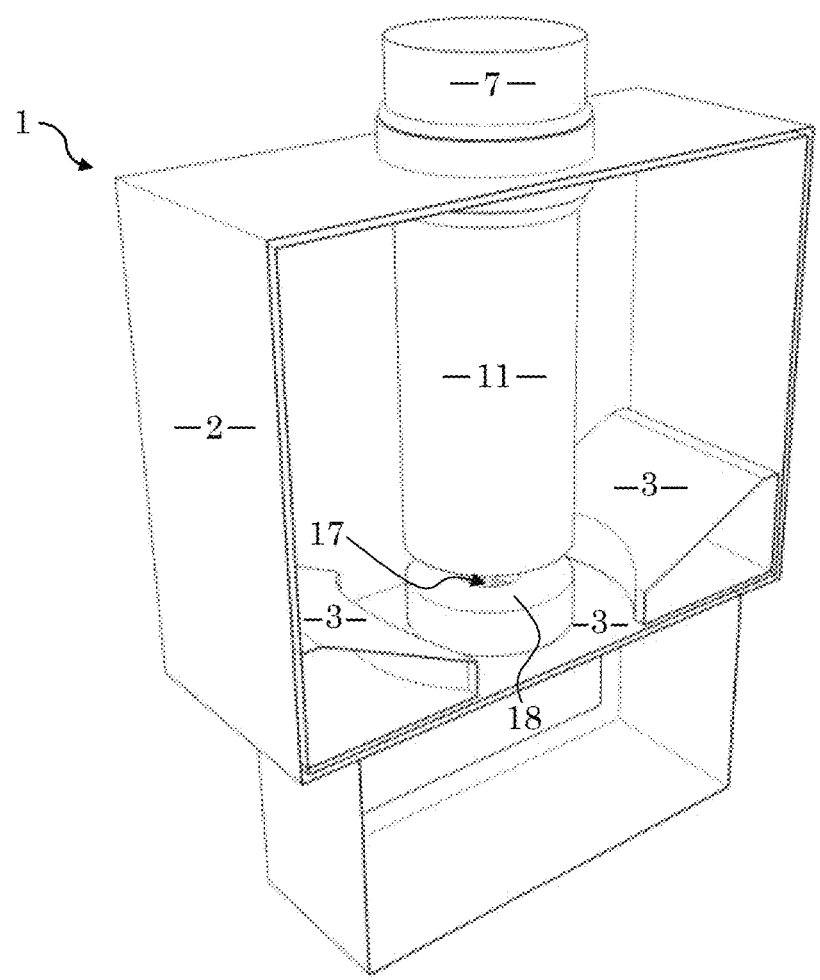
Figure 6:
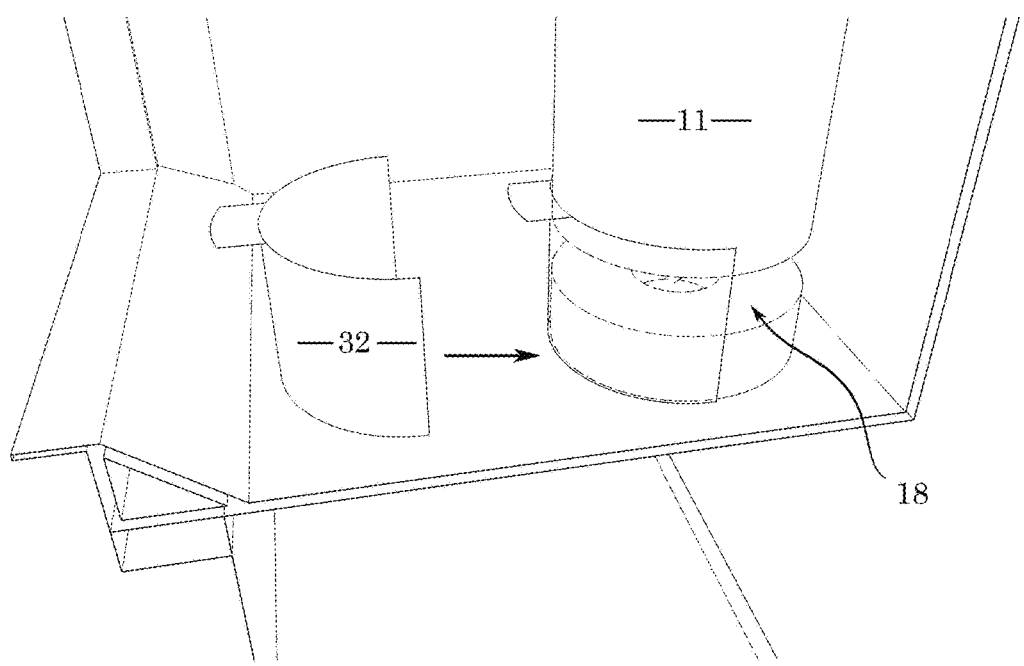

FIG. 1: is a cut-away, side view of one possible embodiment of the present invention, FIG. 2: is a perspective view of the embodiment illustrated in FIG. 1, FIG. 3: is a cut-away, side view of another possible embodiment of the present invention, FIG. 4: is a cut-away, side view of an embodiment of the present invention which has a rear exit flue, FIG. 5: is a cut-away side view of an embodiment of the present invention which includes a tapered firebase, FIG. 6: is a view of a control means, for use with the present invention.

Figure 7:

FIG. 7: is a table showing test result for an embodiment of the combustion system.

DESCRIPTION OF PREFERRED EMBODIMENTS

Having regard to FIGS. 1 and 2 there is shown a combustion system generally indicated by arrow 1.

The combustion system 1 includes a fireplace in the form of a wood burner 2.

The wood burner 2 includes a metal firebox 8. The firebox 8 includes a firebase 3, which effectively forms the floor of the firebox 8 of the wood burner 2.

The wood burner 2 also includes a primary combustion zone, generally indicated by arrow 4, for pyrolysing and/or combusting wood 6, and a secondary combustion zone, generally indicated by arrow 5, for combusting gases and/or particulate matter produced from the pyrolysis and/or combustion of the wood 6.

The wood burner 2 includes a first air supply means 15 in the form of an adjustable air damper (not shown). The first air supply means 15 serves to provide a primary air supply into the firebox 8, and more particularly into the primary combustion zone 4.

The wood burner 2 also includes an exhaust flue, generally indicated by arrow 7.

The upper part 9 of the exhaust flue 7 extends out of the top 10 of the firebox 8 and ultimately extends up and out through the ceiling and roof of the dwelling in which the wood burner 2 is housed.

The lower part 11 of the exhaust flue 7 extends into the firebox 8 to a position near to, or adjacent, the secondary combustion zone 5 (just above the firebase 3). This results in the downdraft or side draft of the combustion gases and/or particulate material. That is, the combustion gases and/or particulate material produced by the pyrolysis and/or the combustion of the wood 6 in the primary combustion zone have to work their way downwards in order to be able to enter the open end of the lower part 11 of the exhaust flue 7. This downdraft (or side draft) is primarily facilitated by the updraft created as heat travels up the flue 7 on the way to being exhausted through the roof or ceiling (that is, in the direction of arrow 21).

The lower part 11 of the exhaust flue 7 may be retrofitted to existing wood burners 2. This is an important feature of the invention, as it allows for the combustion system to be fitted to the many wood burners that are currently being used. Furthermore, owners of wood burners may be encouraged to retro-fit the combustion system 1 to their wood burners given that the cost is minimal and the process simple. And because their modified wood burner will produce far fewer (or negligible) emissions, this clearly has positive environmental considerations. Moreover, if the only option to having a more efficient wood burner was to purchase a replacement wood burner, this cost may be prohibitive for many people.

With respect to the embodiment illustrated, the lower part 11 of the exhaust flue 7 may be inserted into the firebox 8 and crimped onto the lower portion of the upper part 9 of the exhaust flue 7. Alternatively, the lower part 11 of the exhaust flue 7 may be slid into the bottom of the upper part 9 of the exhaust flue 7. Furthermore, the lower part 11 of the exhaust flue may be adjustable whereby the gap between the bottom of the lower flue 11 and the firebase 3 may be adjusted, as required or as desired.

An advantage of such an arrangement is that the combustion system 1 may therefore effectively be retrofitted to existing wood burners 2, thus bringing them up to modern compliance standards. Furthermore, the task of retrofitting to existing wood burners 2, as described above, is a relatively simple, quick and inexpensive operation.

Alternatively, the lower part 11 of the exhaust flue 7 may be incorporated into new wood burners 2.

In the embodiments illustrated the combustion system 1, when in operation, results in a charcoal/reduction layer 12 forming below the primary combustion zone 4, and in the region between the primary combustion zone 4 and the secondary combustion zone 5. The arrangement and construction is such that the gases and/or particulate matter produced from the pyrolysis and/or combustion of the wood in the primary combustion zone 4 have to pass over or through the charcoal/reduction layer 12 prior to entering the secondary combustion zone 5 and/or the exhaust flue 11.

The secondary combustion zone 5 is wholly surrounded by the primary combustion zone 4. The only part of the secondary combustion zone 5 which is not surrounded by the primary combustion zone 4 is where the secondary combustion zone 5 abuts the near side wall of the firebox 8.

Because the secondary combustion zone 5 is surrounded by the primary combustion zone 4 (as well as being surrounded by the charcoal/reduction layer 12), the combustion system 1 is able to reach, and consistently maintain, hot temperatures within the wood burner 2, as well as being able to achieve maximum combustion efficiency (as will be evidenced later in this specification).

That is, the fire-insulated secondary combustion zone 5 keeps temperatures high enough to combust even the compounds with the highest self-ignition temperatures and subsequently the combustion system 1 produces very low emissions. Particulate and carbon monoxide emissions for the combustion system 1 have in fact been measured and are lower than that published for natural gas (as will be evidenced later in this specification).

The combustion system 1, when in operation, often results in an ash layer 13 forming on the firebase 3 below the primary combustion zone 4 and charcoal/reduction layer 12.

The wood burner 2 also includes a drying zone 14 for drying the wood 6 and/or removing water from the wood 6 prior to the pyrolysis and/or combustion of the wood 6 in the primary combustion zone 4. The drying zone 14 is situated above (or within) the primary combustion zone 4. Provision for introducing wood 6 to the wood burner 2 is via a hinged door (not shown) at the front of the firebox 8.

In the embodiment shown, the wood burner 2 also includes a second air supply means for introducing heated secondary air into the firebox 8 in the region of the fire-insulated secondary combustion zone 5, and adjacent to the charcoal/reduction layer 12, to thus heat the secondary air as it is being introduced into the firebox 8.

The secondary air supply means includes a number of apertures 30 which are drilled into the firebase 3 in the region of where the secondary combustion zone 5 will form. Secondary air is drawn from outside of the firebox 8 and directed up through the apertures 30—where the secondary air is heated by the secondary combustion zone 5 and by the adjacent charcoal/reduction layer 12.

It is also envisaged that the apertures 30 could additionally or alternatively be formed in the firebase 3 in the region below the charcoal/reduction layer 12.

Hence, the second air supply means can easily, cheaply and readily be retro-fitted to an existing wood burner as all that is required is the drilling of the apertures 30 in the firebase 3 (and, optionally, adding some ducting if required or desired).

The combustion system 1 also includes insulation means for insulating the region of the secondary combustion zone 5 (and, to a lesser extent, the charcoal/reduction layer 12). The insulating means is in the form of a ceramic disc 18.

One purpose of the ceramic disc 18 is to maximise temperatures within the region of the secondary combustion zone 5.

Another (less important) purpose of the ceramic disc 18 is to introduce a small degree of air turbulence or mixing into the region of the secondary combustion zone 5 which serves to enhance the levels of combustion and/or increase the temperatures of combustion. That is, the presence of the ceramic disk 18 serves to create an air disturbance in the region of the secondary combustion zone 5, and the result may be compared to the act of blowing on a fire to increase its intensity.

The ceramic disc 18 includes a ceramic cone-shaped portion 16 which sits above an aperture 17 in the ceramic disc 18. The cone-shaped portion 16 is supported above the aperture 17 by a metal mesh (metal mesh not shown).

The ceramic disc 18 is surrounded by the charcoal/reduction layer 12. The charcoal/reduction layer 12 is one of the hottest places within the wood burner 2, with temperatures often reaching up to 1500° C. Furthermore, this very high temperature is usually maintained even when fresh wood 6 is placed in the wood burner 2.

The ceramic disc 18 serves as a pre-heater of the secondary air, after the secondary air passes through into the firebox 8 via the apertures 30, but before it passes up through the aperture 17 and into the secondary combustion zone 5. This arrangement serves to heat the incoming secondary air to a point well above 600° C., which is the highest ignition point of wood gas. An advantage of this arrangement is that when new wood 6 is added to the combustion system 1, we are getting ignition instantaneously, whereas other prior art fireplaces take considerable time to reach this temperature (600° C.). And while prior art fireplaces are getting up to temperature, they are admitting polluting gases and particulate matter. Conversely, my combustion system 1 produces nil or negligible polluting gases and particulate matter, due to the consistently high temperature within the firebox 8, and especially within the region of the secondary combustion zone 5 and charcoal/reduction layer 12.

The combustion system 1 and/or wood burner 2 may work, or be operated, as follows:

Firstly, the firebox 8 of the wood burner 2 may be filled with wood 6, and perhaps initially filled with smaller pieces of wood such as kindling, sitting atop paper for ignition purposes.

Once the fire within the firebox 8 has become well established, the wood 6 in the drying zone 14, situated above (or within) the primary combustion zone 4, will rapidly dry out, releasing water vapour in the process. This moisture vapour will in fact become a source of fuel when it is later split into hydrogen and carbon monoxide as it passes over the charcoal/reduction layer 12.

Once the wood 6 has dried out and entered the primary combustion zone 4, it will firstly undergo pyrolysis and combustion to produce predominantly charcoal and tar.

The pyrolysised wood 6 will then undergo further combustion to produce predominantly carbon dioxide and water vapour. If enough oxygen is present, the temperature of combustion may also be sufficient to partially consume the charcoal and tar produced from the pyrolysis of the wood 6, however most existing wood burners would not ordinarily be able to produce sufficient heat to be able to do this.

An advantage of the combustion system 1, is that the combustion gases and particulate matter of pyrolysis are required to travel down and across to the mouth of the lower flue 11 in order to escape to the atmosphere, thus drawing them across the very hot charcoal/reduction layer 12—which greatly enhances the further reduction of the combustion gases, particulate matter and products of pyrolysis to combustible gases. For example, carbon dioxide and water vapour are "reduced" to the more combustible gases of hydrogen and carbon monoxide. The natural draught created by, or adjacent, the lower part 11 of the exhaust flue 7 is adequate to facilitate this process, and one advantage of this process is that it provides for the side draught and/or down draft of the combustion gases and products.

Furthermore, the resultant combustible gases such as hydrogen and carbon monoxide (as well as any other combustion gases and/or particulate materials and/or products of pyrolysis) then pass through the secondary combustion zone 5. The secondary combustion zone 5 includes the provision of secondary air supply means supplying super-heated secondary air which passes into the secondary combustion zone 5 via the aperture 17 in the ceramic disc 18. The secondary air is super heated (well above 600° C.) by virtue of being introduced through the very hot secondary combustion zone 5—which is adjacent the very hot charcoal/reduction layer 12. Moreover, the secondary air is further heated, or intensified, by the presence of the insulating ceramic disc 18.

This super-heated secondary air is important to maintaining consistently high temperatures within the firebox 8 and secondary combustion zone 5, to thus ensure that virtually all (if not all) of the combustion gases and/or particulate matter are fully and completely combusted whereby the combustion system 1 produces nil, or negligible, polluting gases and/or particulate matter.

Furthermore, another important factor in being able to maintain consistently high temperatures within the secondary combustion zone 5 is because the secondary combustion zone is surrounded by, and/or encompassed within, the primary combustion zone—as previously described. That is, the combustion system 1 utilises fire to insulate or heat fire, and this has been found to be a very important feature of the combustion system 1.

The combustion system 1 results in less pollutants being exhausted to the atmosphere generally, and also results in less build up of soot and creosote products on the inside of the exhaust flue 7. For example, testing has shown that these vastly reduced emissions only form very thin white or light grey deposits on the cowl at the top of the flue 7, whereas previously this whole area had been covered in substantive black deposits. It follows therefore that the flue 7 is much less prone to the build up of soot and creosote products, thus reducing maintenance and also reducing the likelihood of chimney fires. Moreover, the unnecessary build up of soot, creosotes or tars within the flue has the detrimental effect of cooling the flue (which this invention minimises or negates).

In one embodiment, one way of further reducing the exhausting of particulate matter from the wood burner 2 would be by separating the primary combustion zone 4 and the secondary combustion zone 5, for example with a mesh screen (not shown).

Some testing on the combustion system 1 was undertaken as part of the "Wood Stove 20 Design Challenge" in the USA in November 2013 and the results are shown in FIG. 7.

Some details relating to the testing is as follows:
1. All the testing was undertaken by the US National Laboratory Brookhaven, owned by the US Government via the Department of Energy.
2. Each stove was tested twice with two different makes of portable gas analysers, the Testo 380 and Wohler SM500, and the probe inserted in an aperture in the flue about 500 mm above the stove.
3. The test result provided is from the Testo 380.
4. The test was conducted on the combustion system 1, when retro-fitted to a 30+ year old Treemont wood stove.
5. Each test was for 15 minutes, my test had to be abandoned at 8:05 minutes because the extreme temperature overheated the gas analyser.
6. My result of zero (uncorrected) carbon monoxide levels are the first instance ever of a wood burner being cleaner than oil or natural gas.
7. The Particulate Matter (PM) readings are also super low and on a comparative basis cleaner than oil or natural gas.
8. Both the PM and CO average emissions for this test are lower than the figure Wikipedia gives for Natural Gas. (Using an online converter for Natural Gas PM).
9. The readings spike at the start of the test because the testers open the flue to put the probe in.
10. The test results are shown in FIG. 7.

FIGS. 3 to 6 illustrate different embodiments of the combustion system 1 (and/or additional features that may be utilised with the combustion system 1). For convenience only, the same reference numerals will be used in relation to the features of FIGS. 3 to 6, which are the same, or similar, to the features noted in FIGS. 1 and 2.

Having regard to FIG. 3, there is shown a cut-away side perspective view of another possible embodiment of the present invention. FIG. 3 illustrates an alternative embodiment whereby the second air supply means includes an air channel 19 which penetrates the outside of the exhaust flue 7 and extends downwards into the region below the ceramic disc 18.

This is achieved by creating an aperture 20 in the side of the exhaust flue 7 at a point above the firebox 8 of the wood burner 2. The air channel 19 may then be inserted through this aperture 20 and be extended downwards and into the ceramic disc 18, as shown. The secondary air travelling through this channel 19 is first heated by the exhausting flue gases within the lower exhaust flue 11. Furthermore, the secondary air is subsequently super heated by virtue of passing through and out of the ceramic disc 18, which sits within the very hot charcoal/reduction layer 12 (and secondary combustion zone 5)—in substantially the same fashion as described in relation to the embodiments illustrated in FIGS. 1 and 2).

FIG. 4 illustrates an embodiment whereby the combustion system 1 can be adapted for use with a wood burner 2 which has a rear exit flue 7.

FIG. 5 illustrates an embodiment where the firebase 3 is tapered towards the secondary combustion zone 5 and/or the charcoal/reduction layer 12 and/or the ceramic disc 18. An advantage of such an embodiment is that the tapered firebase 3 helps to accumulate hot embers and/or charcoal towards, or over, the entrance to the secondary combustion zone 5 and/or around the ceramic disc 18.

FIG. 6 illustrates a control means for controlling the transfer of the gases and/or the particulate matter produced from the pyrolysis and/or combustion of the biomass fuel. That is, the control means controls the transfer of the gases and/or the particulate matter from the primary combustion zone 4 to the secondary combustion zone 5.

The control means is in the form of a metal sleeve 32 which is adapted to partially cut off the secondary combustion zone 5. The metal sleeve 32 serves to restrict the flow of the gases and/or the particulate matter from the primary combustion zone 4 to the secondary combustion zone 6. When the wood burner 2 is in the warm-up phase, then the sleeve 32 may be removed so that a free flow of air occurs between the primary combustion zone 4 and the secondary combustion zone 5. However, when the fireplace is hot, the fire will be more efficient if the transfer of the gases and/or the particulate matter from the primary combustion zone 4 to the secondary combustion zone 6 is restricted, that is by fitting the sleeve 32 around the lower portion of the flue 11.

VARIATIONS

While the embodiments described above are currently preferred, it will be appreciated that a wide range of other variations might also be made within the general spirit and scope of the invention and/or as defined by the appended claims.

I claim:

1. A combustion system, said combustion system comprising:
    a biomass burner that includes:
    i. a firebox,
    ii. a firebase at, or forming, a bottom of the firebox,
    iii. a primary combustion zone for pyrolyzing and combusting the biomass fuel, the pyrolyzing and combusting of the biomass fuel producing gases and particulate matter,
    iv. a first air supply having a first air pathway connected into the firebox to thereby supply primary air into the firebox,
    v. a secondary combustion zone for combusting the gases and the particulate matter produced from the pyrolysis and combustion of the biomass fuel,
    vi. an exhaust flue with an upper part that extends out of a top of the firebox and a lower portion that extends into the firebox to a location above a first portion of the firebase and adjacent a region of said secondary combustion zone,
    wherein the firebase includes a charcoal/reduction layer support region, the charcoal/reduction layer support region supporting a charcoal/reduction layer which forms below the primary combustion zone, in the region of the secondary combustion zone, and between the primary combustion zone and the secondary combustion zone,
    the secondary combustion zone being at least partially surrounded by the primary combustion zone,
    wherein an opening of the lower portion of the exhaust flue is located above the first portion of the firebase, the first portion of the firebase including a first part of the charcoal/reduction layer support region included in the region of said secondary combustion zone in which the charcoal/reduction layer is formed,
    wherein the gases and the particulate matter produced from the pyrolysis and combustion of the biomass fuel in the primary combustion zone pass over, or through, said charcoal/reduction layer and over said charcoal/reduction layer support region including the first portion of the firebase, prior to entering the secondary combustion zone and the opening of the exhaust flue; and
    a second air supply comprised of at least one aperture, each aperture having an inlet directly exposed to atmosphere, each aperture extending through the first portion of the firebase and having an outlet located below a lower surface of the charcoal/reduction layer in the region of the secondary combustion zone to thereby introduce a secondary air drawn from outside the firebox, through the at least one aperture, and discharged into the firebox at the first portion of the firebase below and through the charcoal/reduction layer in the region of the secondary combustion zone,
    wherein the secondary air, being discharged through the at least one aperture below a lower surface of the charcoal/reduction layer in the region of the secondary combustion zone, is heated by passing through the charcoal/reduction layer and the secondary combustion zone, as the secondary air is being introduced into the firebox, above 600° C. and maintained above 600° C. at a temperature sufficient to combust the combustible gases and the particulate matter in the secondary combustion zone.

2. The combustion system as claimed in claim 1, wherein said secondary combustion zone is wholly surrounded by said primary combustion zone.

3. The combustion system as claimed in claim 2, wherein said first air supply comprises an air damper.

4. The combustion system as claimed in claim 1, wherein said one or more apertures comprise plural apertures in the firebase below the secondary combustion zone.

5. The combustion system as claimed in claim 4, wherein said first air supply comprises an air damper.

6. The combustion system as claimed in claim 4, further comprising:
    a ceramic disc located above the plural apertures, the ceramic disc having a ring and a main body supported by the ring, the surrounding the plural apertures and supporting the main body spaced apart from the plural apertures, the ring and main body defining a space between an upper surface of the firebox located around the plural apertures and a lower surface of the main body, the main body having a central aperture and a cone portion extending into the central aperture, a top of the cone portion being located above a top surface of the main body,
    wherein the charcoal/reduction layer surrounds the ceramic disc,
    wherein the secondary air, after passing through the plural apertures, passes through the space along the lower surface of the ceramic disc and out through the central aperture of the main body along the cone portion into the secondary combustion zone, and
    wherein the firebase forms the bottom of the firebox.

7. The combustion system as claimed in claim 1, wherein said first air supply comprises an air damper.

8. The combustion system as claimed in claim 1, wherein the combustion system further includes insulation insulating the region of the secondary combustion zone and/or the charcoal/reduction layer.

9. The combustion system as claimed in claim 8, wherein said insulation includes one or more apertures, through which the secondary air may pass.

10. The combustion system as claimed in claim 8, wherein said insulation is in the form of a ceramic disc.

11. The combustion system as claimed in claim 1,
    wherein the firebase forms the bottom of the firebox,
    wherein said secondary combustion zone is wholly surrounded by said primary combustion zone, wherein said one or more apertures comprise plural apertures in the firebase below the secondary combustion zone, and further comprising:

a ceramic disc located above the plural apertures, the ceramic disc having a ring and a main body supported by the ring, the surrounding the plural apertures and supporting the main body spaced apart from the plural apertures, the ring and main body defining a space between an upper surface of the firebox located around the plural apertures and a lower surface of the main body, the main body having a central aperture and a cone portion extending into the central aperture, a top of the cone portion being located above a top surface of the main body, wherein the charcoal/reduction layer surrounds the ceramic disc, and the secondary air, after passing through the plural apertures, passes through the space along the lower surface of the ceramic disc and out through the central aperture of the main body along the cone portion into the secondary combustion zone.

12. The combustion system as claimed in claim 1,
wherein the firebase forms the bottom of the firebox,
wherein said secondary combustion zone is wholly surrounded by said primary combustion zone,
wherein said one or more apertures comprise plural apertures in the firebase below the secondary combustion zone, and further comprising:

a ceramic disc located above the plural apertures, the ceramic disc having a ring and a main body supported by the ring, the surrounding the plural apertures and supporting the main body spaced apart from the plural apertures, the ring and main body defining a space between an upper surface of the firebox located around the plural apertures and a lower surface of the main body, the main body having a central aperture, wherein the charcoal/reduction layer surrounds the ceramic disc, and the secondary air, after passing through the plural apertures, passes through the space along the lower surface of the ceramic disc and out through the central aperture of the main body into the secondary combustion zone.

* * * * *